United States Patent [19]

Graber

[11] Patent Number: 5,504,974
[45] Date of Patent: Apr. 9, 1996

[54] COMBINATION DOOR HANDLE AND GRAB BAR FOR AN AGRICULTURAL OR INDUSTRIAL CAB DOOR

[76] Inventor: Philip P. Graber, 16581 County Hwy. N., Blanchardville, Wis. 53516

[21] Appl. No.: 335,464

[22] Filed: Nov. 7, 1994

[51] Int. Cl.$^6$ .............................. E05B 7/00; E05B 65/10; E05C 3/06
[52] U.S. Cl. .............................. 16/112; 16/111 R; 49/141; 49/460; 292/236
[58] Field of Search .................................. 16/112, 114 R, 16/111 R, 115; 49/141, 394, 460; 292/236, 238, 239

[56] References Cited

U.S. PATENT DOCUMENTS

| | | |
|---|---|---|
| 1,214,071 | 1/1917 | Rasmus . |
| 2,117,192 | 5/1938 | McClung . |
| 2,123,866 | 7/1938 | Anderson . |
| 3,073,142 | 1/1963 | Stebbins . |
| 3,428,350 | 2/1969 | Trammell, Jr. . |
| 3,940,886 | 3/1976 | Ellington, Jr. ............................ 49/141 |
| 3,967,850 | 7/1976 | Whisler ..................................... 49/460 |
| 4,086,728 | 5/1978 | Fosseen . |
| 4,305,612 | 12/1981 | Hunt et al. . |
| 4,713,860 | 12/1987 | Mobley et al. ............................ 16/112 |
| 5,005,255 | 4/1991 | Pare et al. . |
| 5,210,905 | 5/1993 | Dietz et al. . |

Primary Examiner—Maurina T. Rachuba
Assistant Examiner—Adesh Bhargava
Attorney, Agent, or Firm—Andrus, Sceales, Starke & Sawall

[57] ABSTRACT

This invention is a combination door latch actuating handle and an exit/entry operator support assembly, mainly for the interior but also usable for the exterior of a vertically oriented door for any agricultural or industrial equipment with a cab. It consists of two nearly full width of door, U-shaped, interlocking and generally horizontally mounted pieces. One U-shaped piece is a mounting/pivot and stops bracket attached to the door, and the other is a swingable door latch actuating handle/grab bar. An unlatching position is oriented generally upward and outward, actuating the latch with a cable; and a simple gravity designed latching position is oriented inwardly and downward. These motions are in perfect harmony with the operator's movements as one exits or enters the cab. It increases the safety of an operator over existing designs by providing a more visible, accessible and easier to use door latch actuating handle for emergency exits. During an operator's exit or entry, the assembly does not catch clothing and its compactness and rounded surfaces almost eliminate any chance of injury by bumping against the assembly.

13 Claims, 3 Drawing Sheets

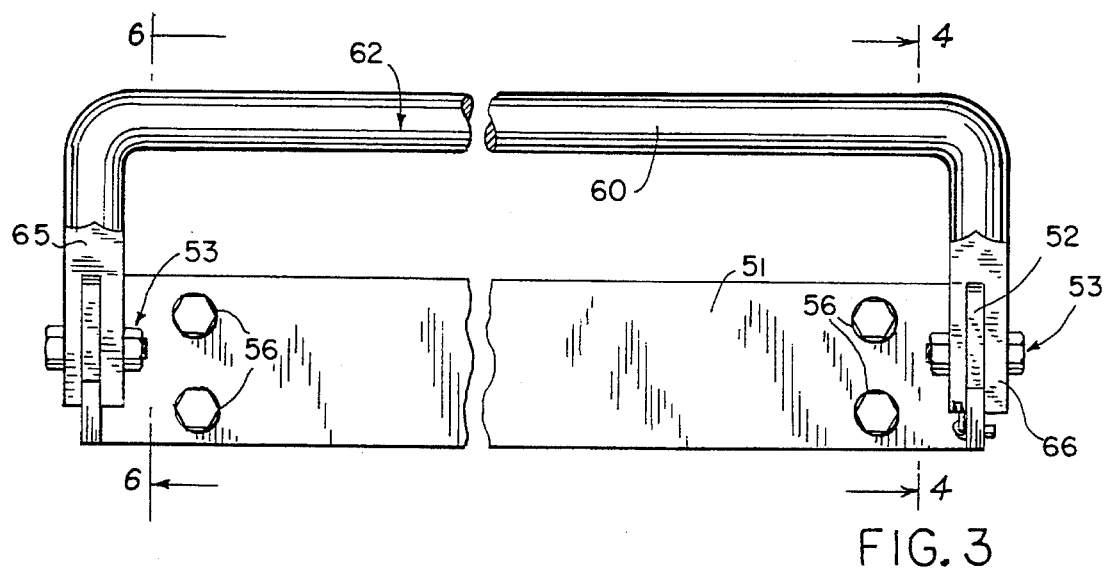
FIG. 3
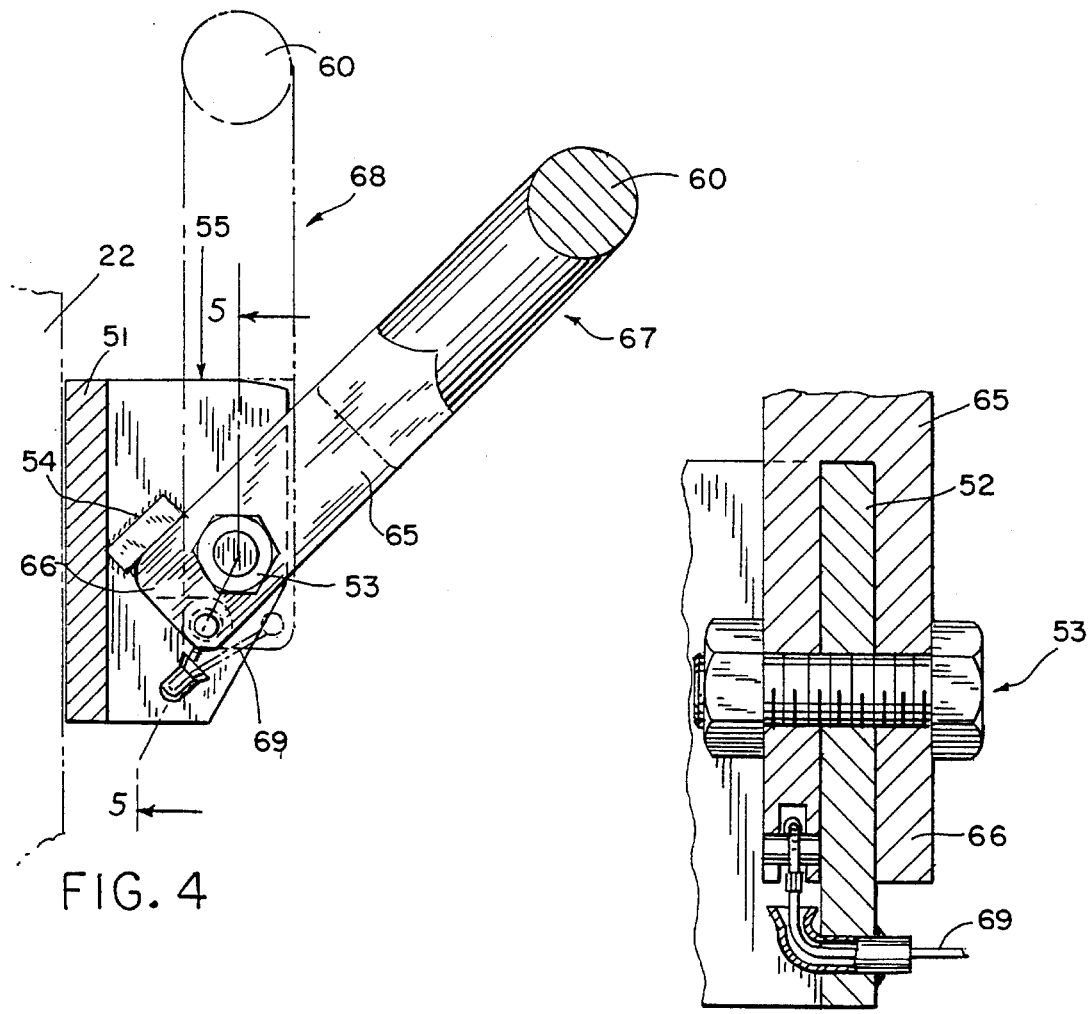
FIG. 4
FIG. 5

COMBINATION DOOR HANDLE AND GRAB BAR FOR AN AGRICULTURAL OR INDUSTRIAL CAB DOOR

TECHNICAL FIELD AND BACKGROUND OF THE INVENTION

This invention generally relates to a door latch actuating handle and an exit/entry operator support assembly mainly for the interior, but also usable for the exterior of a vertically oriented door on any agricultural or industrial equipment with a cab. Specifically, this invention is a combination of the two assemblies.

In recent years, more agricultural equipment has been manufactured with cabs to protect the operator from inclement weather. Some existing commercial agricultural latch actuating handles on the inside of cabs are so small that they are hard to locate and grab in an emergency situation for a quick exit. Their small size also makes it difficult to close the door, but they are still big enough to catch an operator's coat sleeve, which could cause an injury during exit or entry.

One example of a control handle for a vertical door is disclosed in U.S. Pat. No. 1,214,071 issued Jan. 30, 1917 to Rasmus. In this design, by pressing down upon a lever, a corresponding downward movement is communicated to a set of spring biased toggle levers which cause the door to open. Upon release of the lever, the coil spring effects a reversal of this operation so that the door can be closed. While this design allows the door to be opened and closed, an operator leaning on or otherwise holding the hand lever for support could suffer serious injury as the door could open during vehicle movement because it lacks a lock.

Another example of a grab handle and door stop assembly is shown in U.S. Pat. No. 3,967,850 issued on Jul. 6, 1976 to Whisler. In this patent, a vehicle cab is provided with a small and separate inside door handle serving to release the latch mechanism which holds the door closed. Located inside the cab and combined with the door is a grab handle and door stop assembly having a spring actuated grab handle assembly pivotable about an upright axis for the operator to grab and help oneself into the cab. While a downward and outward force directed on the handle will not be sufficient to disengage the roller from the detent recess with the door open, the operator once inside the cab can pull the door shut by grasping the grab handle section and pulling rearwardly with a quick jerk. While this design provides some measure of support for an operator getting into and out of a cab, this assembly is still deficient in providing a combination door latch handle which will unlatch and latch the door, as well as act as grab bar to provide a measure of safety for an agricultural or industrial equipment operator at all times.

It remains desirable to invent an improved combination door latch actuating handle and exit/entry grab bar assembly for an agricultural or industrial cab door, of a modified type from those shown in the prior patents. It is desirable to provide a door latch handle which is easy to see and closer to the seated operator than the typical six inch horizontal or vertically oriented handle. It is further desirable to provide a strong handle that an operator could grab while seated to help pull oneself up and out of the seat. While starting to get out, it is desirable that an operator be able to push open the door and continue getting out without having to look to grab something else for support while the operator has the door open and is at the threshold looking for the first step down and out of the cab. It is also desirable that while the operator is descending down the steps, that there is no chance of a sleeve or other clothing getting caught, thereby causing the operator to slip or hurt oneself. The combination door handle/grab bar overcomes the problems noted in the prior patents. It is mainly for interior applications but it can also be used on the exterior of a vertically oriented agricultural or industrial cab door. It utilizes a manually selectable door latching handle and grab bar position with a manual or remote electric lock on the latch assembly, and it has a door unlatching position. The system has an ergonomically grippable construction which extends nearly the full width of a cab door and is designed for safety, strength, durability, and longevity.

These and other aspects of the invention are realized in a combination door latch handle and an exit/entry operator support assembly generally horizontally oriented on a vertically oriented agricultural or industrial equipment cab door. It consists of two nearly full width of door, U-shaped, interlocking and generally horizontally mounted pieces. One U-shaped piece is a mounting/pivot and stops bracket attached to the door with bolts or rivets or welding or the like. The main mounting plate has a left and right mounting/pivot and stops ear welded to it in a generally perpendicular position at each end of the plate. A generally U-shaped combination door latch handle and grab bar has an elongated main body and a forked leg extending generally perpendicular at each end. A pivot means is provided in the combination door latch handle and grab bar about a generally horizontal axis passing through the mounting ears and the legs of the door latch handle. A release means in the form of a cable is connected to one of the legs for unlatching the cab door. The door latch actuating handle is nearly the full width of the door so it is easier to locate visually and physically, and actuate in an emergency situation. Although its size alone should make it much more visible, reflective tape attached to the door handle would make it even more visible throughout the day. The handle, is also slightly closer to the operator seated in the cab when the door is closed because an acute angle from vertical is needed to achieve a simple gravity latching position, thereby eliminating the need for a spring. It also doubles as a safe support structure for exit and entry because it doesn't have any protruding elements to catch an operator's clothing, such as a coat sleeve. All the agricultural or industrial equipment with cabs that have hinged doors that this inventor has seen, have doors that swing outward, the same direction as egress. It would be logical to have a door latch actuating handle work in the same direction. This innovation makes exit and entry easier and safer in one fluid and logical motion, without conscious effort.

BRIEF DESCRIPTION OF THE DRAWINGS

The invention should become better understood with reference to the following detailed description when read in conjunction with the appended drawings, wherein like numerals denote like elements

FIG. 3 is an elevational plan view of a combination door handle and grab bar shown in FIG. 1;

FIG. 4 is a cross-sectional view taken on line 4—4 of FIG. 3 showing the door handle in the inoperative/latched and operative/unlatching positions;

FIG. 5 is a cross-sectional view taken on line 5—5 of FIG. 4; and

DETAILED DESCRIPTION OF THE PREFERRED EMBODIMENTS

Figure 1:
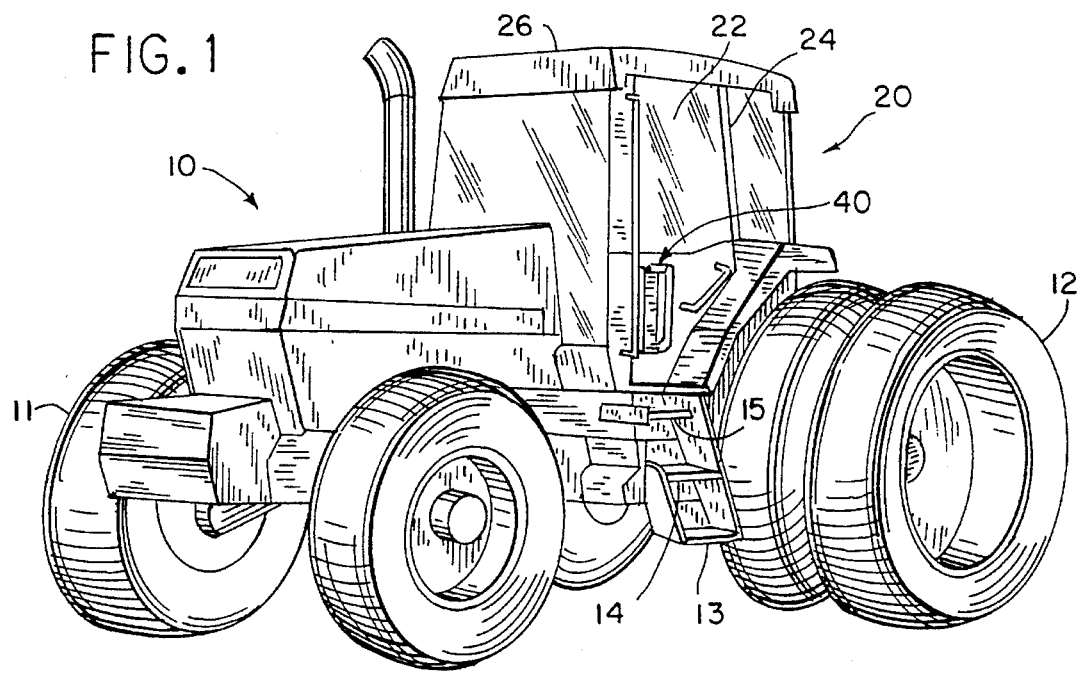
FIG. 1 is a left side perspective view of an agricultural tractor with a cab having a door structure embodying a combination door latch handle and grab bar constructed according to the principles of the present invention.

Referring now to FIG. 1, there is shown an agricultural tractor 10 with only front wheel steering 11 and constant rear wheel drive 12. Ahead of the rear wheels and above the ground are vertically spaced steps 13, 14 and 15 to aid the operator in and out of the left side of the cab 20. Directly above the highest step 15 is a generally vertically oriented cab door 22 which is hinged at the rear 24. Forward of the front edge of the door 22 is an exterior and vertically positioned grab bar 26 that an operator can use to help pull oneself up the steps 13, 14 and 15 until the operator can reach a combination door latch actuating handle and operator support assembly 40, which can be used externally but is mainly for interior applications on the cab door, usually horizontally but sometimes vertically mounted.

Figure 2:
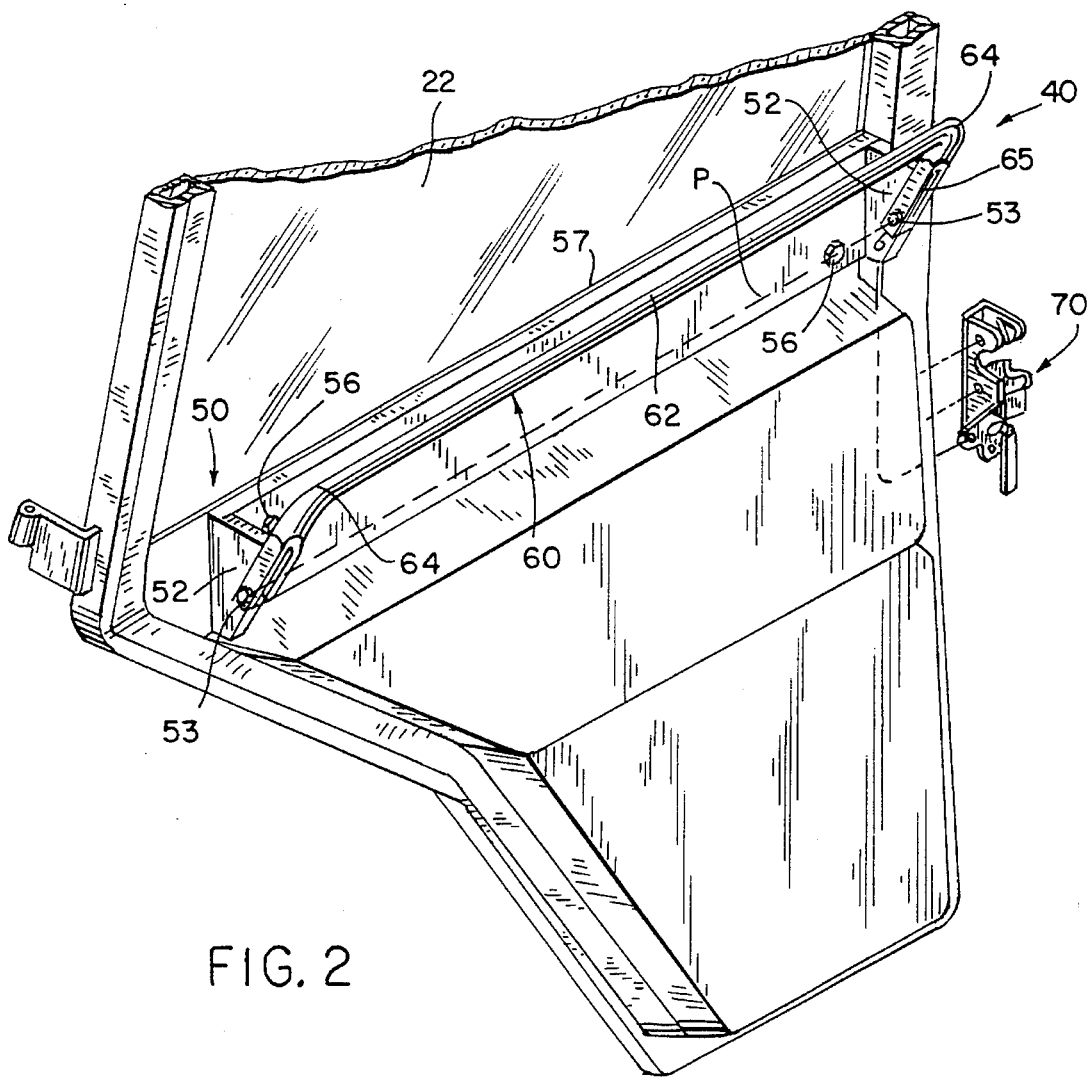
FIG. 2 is a perspective view of a combination door handle and grab bar.
Figure 6:
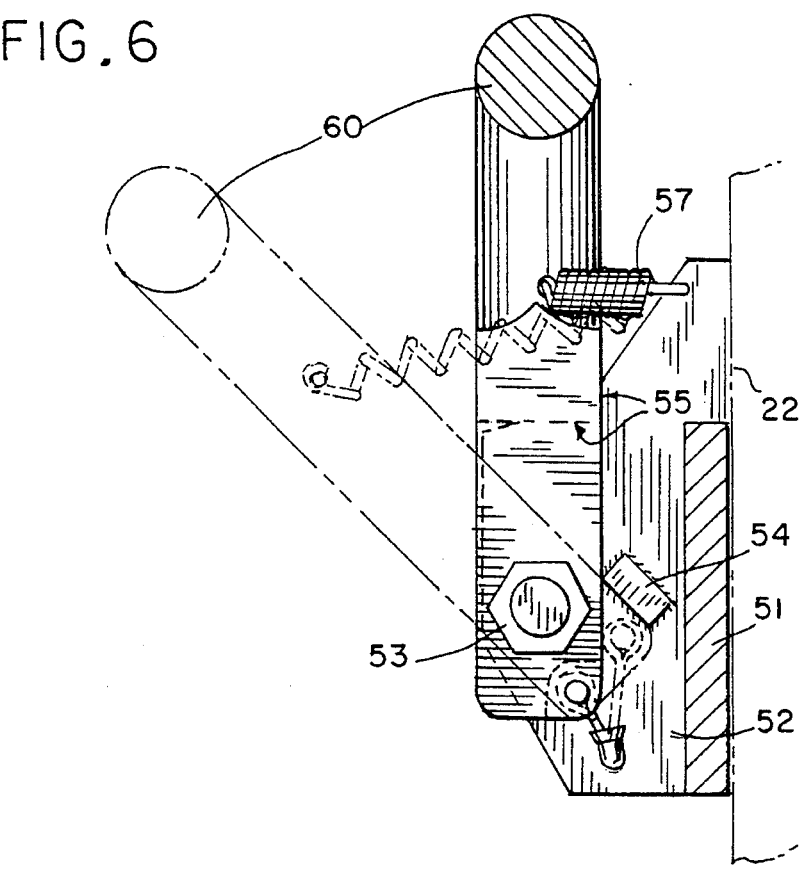
FIGS. 6 and 7 are alternative embodiments of a combination door handle and grab bar utilizing a spring.
Figure 7:
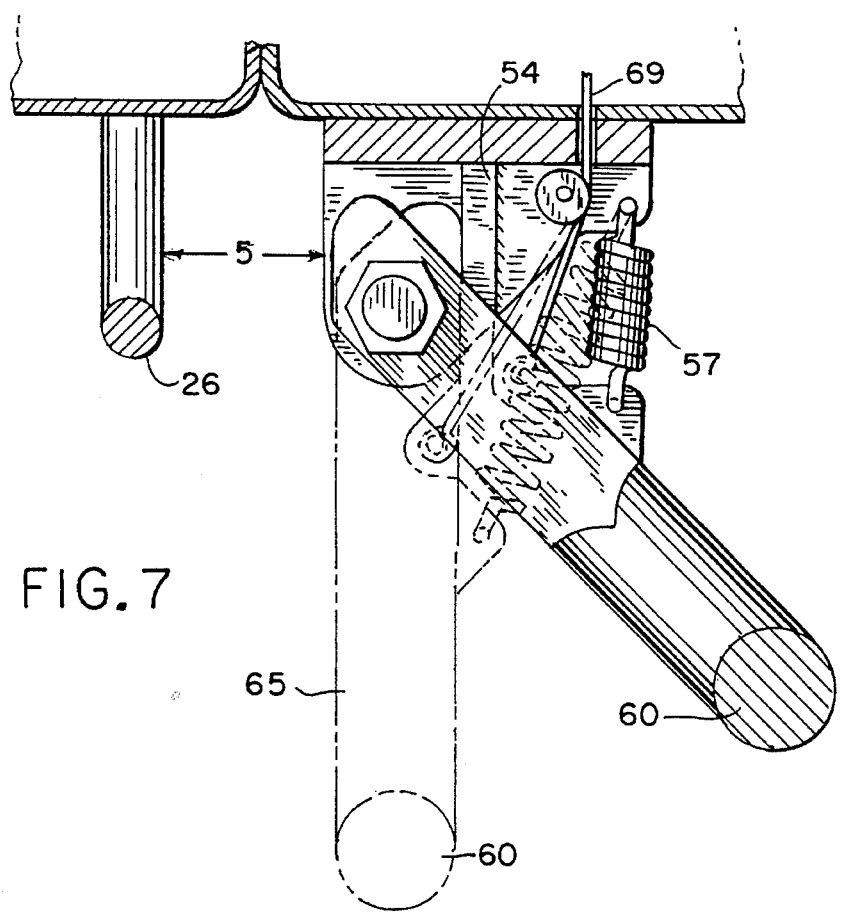

Referring to FIG. 2, there is illustrated a combination door handle and grab bar assembly 40 shown attached generally horizontally along the nearly full width on the inside of a cab door 22 of an agricultural or industrial piece of equipment or the like. Assembly 40 includes a generally U-shaped support bracket 50 having a main mounting plate 51 and a pair of mounting ears 52 with a pivot 53 and stops 54 and 55 (FIG. 4) which are welded on, extend inwardly from the cab door 22 and are positioned generally perpendicular at each end. A set of four hexhead mounting bolts 56 is used to securely join the support bracket 50 to the inside of the cab door 22 brace, frame or surface preferably at a location which will not impair visibility with respect to the cab window(s). For exterior applications on cab doors (FIGS. 6 and 7), a spring 57 would connect the support bracket 50 to the door handle/grab bar 60 on the hinged side 24 of the door 22, thus keeping the door handle/grab bar 60 in the closed or door latching position which is opposite of the interior closed position. In such an exterior application, the space S (FIG. 7) between the vertically positioned grab bar 26 and the leg 65 in the closed or door latching position is a sufficient distance to allow insertion of an operator's hand. A generally U-shaped combination door handle/grab bar (FIG. 2) 60 has an elongated cylindrical main body 62 with elbow bends 64 and bifurcated legs 65 extending generally perpendicular at each end. The legs are designed to lie on each side of a mounting ear 52. A pivot assembly 53 defines a pivot axis P (FIG. 2) for swingably mounting the combination door latch handle/grab bar 60 about the horizontal axis P passing through the mounting ears 52 and the lower portion 66 of each leg 65 and lying parallel to the plane of the cab door 22.

As can be seen in FIG. 4, the lower portions 66 of each leg 65 contact the stops 54 when the combination door handle/grab bar 60 is pivoted in and downward at 67 away from the cab door 22. When an operator is seated in the cab 20, it is designed such that swingable movement of the combination door handle/grab bar 60 up and outward such as at 68, will open the door 22. Attached to one end of the lower portion 66 of one leg 65 and through mounting ear 52 is a latch actuating cable arrangement 69 which goes to a conventional door latch assembly 70. It is an important concept of the invention that the lower ends 66 of the combination door handle/grab bar 60 are selectively disengaged at 67 or engaged at 68 manually with the lower stops 54 or the mounting/pivot ear top stops 55 to dispose the combination door handle/grab bar 60 between a gravity induced door latching position at 67 (in and downward in which no spring is needed to keep the handle in the closed position because of the acute angle away from the cab door 22) and a door unlatching position at 68 that is oriented generally up and outwardly to the cab door 22. For example, an operator who deliberately or accidentally applies an inward and downward force to the combination door handle and grab bar 60 will find support which is immovable in a direction away from the cab door 22. However, in contrast with the prior art, the combination door handle and grab bar 60 may be manually pushed up and out to the position shown in phantom lines 68 of FIG. 4 in which the cable 69 on the door latch 70 is pulled to activate and open the cab door 22 unless the door latch is locked. With the cab door 22 open, an operator simply pulls the door handle/grab bar 60 in and down to 67 so one may then safely pull oneself into the cab. The operator smoothly continues in while sliding their hand on the elongated door handle/grab bar 60 and starts to descend into their seat while pulling in and down on the door handle/grab bar 60 to automatically latch the door 22. The door handle/grab bar 60 remains in place at 67 because gravity was designed in to eliminate the need for a spring on interior applications that are generally horizontally mounted. The exterior handle will need a spring to hold either the generally horizontally mounted door handle/grab bar assembly in a generally vertically oriented closed position or to hold the generally vertically mounted door handle/grab bar generally parallel with the width of the door in the closed position.

In the preferred embodiment, the legs 65 of the door handle/grab bar 60 are oriented between a generally acute angle at 67 and a generally vertical angle at 68 with respect to the plane of the cab door 22.

Unlike the prior art, the present invention provides a unique combination door handle/grab bar 60 which is of extremely simple yet rugged construction without any inherent complex components and without any need for biasing elements such as springs on interior applications. The assembly should be inexpensive to manufacture, easily installed with a minimum of tools and fasteners and should be capable of long service with minimal maintenance.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A combination door latch actuating handle and exit/entry operator support assembly for an agricultural or industrial cab door comprising:

a support structure connected to the cab door; and a generally U-shaped combination door handle and grab bar swingably mounted to the support structure and carrying a release means for unlatching the cab door, the disengagement and engagement of a lower portion of the combination door handle and grab bar on the inside of the door alternately defining a gravity induced door latching position oriented inwardly and downwardly away from the cab door, and a door unlatching position oriented generally upwardly and outward to the cab door.

2. The assembly of claim 1, wherein the support structure comprises a generally U-shaped support bracket connected to the door.

3. The assembly of claim 2, wherein the combination door handle and grab bar is swingable from the latching position only in an upward and outward direction towards the cab door.

4. The assembly of claim 2, wherein the combination door handle and grab bar and the U-shaped support bracket extends generally horizontally across nearly the full width of the inside of the cab door.

5. The assembly of claim 2, wherein the relationship of the combination door handle and grab bar between the door latching position and the door unlatching position is springless because of the incorporation of gravity into the design to keep the door latch handle in the latched position.

6. A combination door latch actuating handle and an exit/entry operator support assembly for a vertically oriented agricultural/industrial cab door comprising:

a support bracket having a main support plate and a pair of mounting/pivot and stop ears, each of the mounting/pivot and stop ears extending inwardly from the cab door and positioned generally perpendicular to the main support plate at each end;

a retaining means for affixing the support bracket to the cab door;

a generally U-shaped combination door handle and grab bar having an elongated main body and a leg extending generally perpendicular to each end, each leg defining a lower end;

a pivot means for swingably mounting the combination door handle and grab bar lower legs about a horizontal axis passing through the mounting ears and the legs parallel to the plane of the cab door;

a release means connected to one of the legs for unlatching the cab door;

the engagement of the lower ends of the combination door handle and grab bar legs being manually and selectively engageable and disengageable with the support bracket to dispose the combination door handle and grab bar between a generally vertical angle defining a door unlatching position reached by manually swinging the combination door handle and grab bar upwardly and outwardly towards the cab door; and an acute angle defining a door latching position reached by manually swinging the combination door handle and grab bar inwardly and downwardly away from the cab door.

7. The assembly of claim 6, wherein each of the legs is bifurcated and disposed to receive one of the mounting ears therebetween.

8. The assembly of claim 6, wherein the release means is mounted on a bottom portion of one of the legs and the support bracket.

9. The assembly of claim 6, whereby the door latching position further defines a grab bar position providing support with respect to the cab door.

10. The assembly of claim 6, wherein the elongated main body defines a hand grippable portion for manipulating the combination door handle and grab bar.

11. A combination door latch actuating handle and an exit/entry operator support assembly mainly for interior applications and generally horizontally attached on a vertically oriented agricultural/industrial cab door having a generally U-shaped support bracket affixed to the cab door and having a main support plate and a pair of upper and lower mounting/pivot and stop ears, each positioned generally perpendicular to the support plate at each end, and a generally U-shaped combination door handle and grab bar having an elongated main body and a leg extending perpendicular at each end swingably mounted to the support bracket for limited manual movement to and from the cab door for the purpose of unlatching and latching the cab door, the improvement wherein:

the combination door handle and grab bar is immovable in one direction beyond a door latching, grab bar position oriented inwardly and downwardly away from the cab door such that the legs of the combination door handle and grab bar abut the lower mounting/pivot and stop ears and is moveable by hand only in a reverse direction towards a door unlatching position in which the legs of the combination door handle and grab bar are disengaged from the lower mounting/pivot and stop ears only to reengage the upper mounting/pivot and stop ears.

12. The assembly of claim 11 including a spring positioned between the support bracket and the combination door handle and grab bar for holding the latter in the door latching position.

13. The assembly of claim 12, wherein the space between the vertically positioned grab bar and the leg in the door latching position is a sufficient distance to permit insertion of an operator's hand.

* * * * *